Sept. 27, 1955  E. A. GOLDMAN  2,719,098
GROUND GLASS SURFACES WITH PROTECTIVE AND STABILIZING
THERMOSET POLYSILOXANE COATING
Filed May 11, 1953
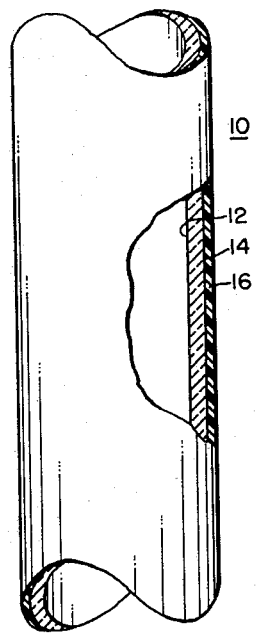
WITNESSES:
Robert C Baird
INVENTOR
Ernest A. Goldman.
BY
Frederick Shapoe
ATTORNEY

United States Patent Office 2,719,098
Patented Sept. 27, 1955

2,719,098

GROUND GLASS SURFACES WITH PROTECTIVE AND STABILIZING THERMOSET POLYSILOXANE COATING

Ernest A. Goldman, Bloomfield, N. J., assignor to Westinghouse Electric Corporation, East Pittsburgh, Pa., a corporation of Pennsylvania Application May 11, 1953, Serial No. 354,081

3 Claims. (Cl. 117—124)

This invention relates to members comprising glass parts having ground surfaces and applied thereto coatings of thermoset polysiloxane resins.

It is known to apply various siloxanes to glass members having smooth surfaces as result from solidification of a molten body of glass. In many instances such siloxanes comprise ordinary silicone oils. In other instances chlorosilanes are applied to glass surfaces in order to render them hydrophobic.

The object of the present invention is to provide for applying to ground glass surfaces a thermoset polysiloxane resin in order to render the otherwise translucent surface fully transparent and to protect the surface from chemical and mechanical deterioration as well as to improve its electrical properties.

Another object of the invention is to provide an electrical member having glass parts whose surfaces have been ground to precise dimensions and such ground surfaces are thereafter coated with a thermoset polysiloxane resin in order to render the surfaces transparent and to improve their properties.

Other objects of the invention will in part be obvious and will in part appear hereinafter. For a better understanding of the nature and objects of the invention, reference should be had to the following detailed description and drawing in which the single figure is a fragmentary section through a glass tube prepared in accordance with the invention.

I have discovered that members of glass having ground surfaces which are translucent but not transparent can be coated with a smooth thermoset layer of polysiloxane resins whereby the ground surfaces become fully transparent. The coating of thermoset polysiloxane resin protects and stabilizes the ground glass surfaces from crazing and chemical deterioration. The coated ground glass surfaces are particularly satisfactory for use in high frequency and high voltage electrical apparatus inasmuch as the capacitance is more constant and the electrical resistance is greatly improved, in spite of changes in atmospheric humidity.

Various glass parts may be treated in accordance with the invention. Among suitable glasses are soda glass, lime glass, lead glass, borosilicate glass, and high silica glasses. The surface of the glass may be ground in any suitable manner to produce a desired shape and degree of accuracy desired, usually to a 0.001 inch precision. The grinding may be accomplished on centerless or other grinders or may be carried out by hand procedure using suitable abrasives, such as aluminum oxide and silicon carbide. Ordinarily, the surfaces will have a roughness of from 40 to 100 microinches R. M. S. (root-mean-square). Glass surfaces in this ground condition are translucent but not transparent.

In order to render the ground glass surfaces transparent they are provided with a coating of a thermosettable polysiloxane resin which is then cured to a thermoset state. The coating is preferably applied by dipping from a thin solution of the polysiloxane resin in order to provide a smooth coating of the composition on the ground glass surfaces. Thereafter the applied coating of polysiloxane resin is dried to evaporate any solvent therefrom and baked at an elevated temperature in order to fully cure the resin to a thermoset state.

Suitable polysiloxane resins comprise siloxanes having an R to Si ratio of from 1.0 to 1.9. The R is preferably selected from hydrocarbon radicals such as phenyl, methyl, ethyl, butyl, tolyl and xylyl radicals. Good results may be obtained from methyl polysiloxanes having an average of 1.6 methyl groups per silicon atom. I have secured particularly good results with phenylmethylsiloxanes having an R to Si ratio of from 1.3 to 1.5 and with an average of two methyl groups for each phenyl group. It will be understood that there are no pigments in the polysiloxane resins employed in practicing the present invention. In order to withstand normal wear and tear and stresses developed by changes in temperature, the thermoset polysiloxane resins should be curable to a hard condition but possess sufficient cold flexibility to adhere to the ground glass surfaces even at temperatures of —40° C. The thermoset polysiloxane resins will withstand boiling water, acids and the like.

The following examples illustrate the practice of the invention:

*Example I*

A glass tube with a precise inside diameter was ground between centers on a cylindrical grinder to a precise outside diameter within 0.001 inch. This glass tube is employed in a high voltage gas switching tube and must have a smooth outer surface in order to prevent corona and arcing developing at the ground glass surfaces. A ground surface gathers dust and has low resistivity in damp weather. The outside diameter was found to have a surface roughness of from 56 to 80 microinches R. M. S. The tube was translucent but not transparent. The ground glass tube was cleaned by first dipping it into a hot alkali cleaner, rinsed in distilled water, dipped in 0.01 N hydrochloric acid, again rinsed in distilled water, then in alcohol and finally dried in an oven. After cooling to room temperature, the tube was dipped in a polysiloxane varnish thinned to a low viscosity. The resin in the polysiloxane varnish comprised a phenylmethylsiloxane polymer having an R to Si ratio of 1.5 and with two methyl groups per phenyl group. The tube was slowly withdrawn from the varnish in order to produce a smooth uniformly thick coating on the ground glass surfaces. The coated tube was dried at room temperature for 15 minutes in order to remove the solvent therefrom. The coated tube was then placed in an oven where it was rapidly heated to 100° C. and the temperature was then raised at the rate of 10° C. per minute to 250° C. and held at this temperature for two hours. The coating was found to be fully cured to a thermoset condition at the end of this time. Its thickness was found to be 0.90 mil.

The drawing shows the tube produced in accordance with Example I. The glass tube 10 has an inner surface 12 and an outer surface 14, the latter having been ground to a precise diameter. The coating 16 of cured thermoset polysiloxane resin is applied over the ground surface 14.

The coated tube 10 is completely transparent and it is extremely difficult to detect that it has been coated with the polysiloxane resin. Long-time tests of the treated tube show no chemical or mechanical deterioration such as would occur if the ground glass surfaces were not protected with the polysiloxane resin coating 16. The capacitance of the glass does not vary with changes in humidity as would occur were the ground glass surfaces not coated as disclosed herein.

*Example II*

A precision capacitor is prepared from plates of glass whose surfaces have been ground to precise dimensions. Ground glass surfaces vary in capacitance as the relative humidity of the atmosphere varies. The ground glass capacitor plates were dipped in a phenylmethylpolysiloxane resin solution having an R to Si ratio of 1.3 and with two methyl groups per phenyl group. The coated glass plates are then air dried and baked in accordance with the procedure set forth in Example I. The resulting thermoset coatings are of a thickness of 0.5 mil. Capacitors prepared from such treated ground glass members are no longer affected appreciably by atmospheric and weather changes. Consequently, the capacitors are better adapted for their intended application.

Numerous other ground glass members may be treated as disclosed herein. The cured thermoset coatings of polysiloxane resin may be of a thickness of from 0.1 mil to 10 mils. However for most purposes, the coatings will vary from 0.5 to 1.5 mils in thickness.

It will be understood that the description of the invention is only exemplary and not limiting.

I claim as my invention:

1. A member comprising a glass part, the glass part having an unpolished, ground surface having a surface roughness of from about 40 to 100 microinches R. M. S.; the ground surface of the glass part being translucent, and a smooth coating of a transparent, thermoset polysiloxane resin applied to the ground surface; the applied polysiloxane resin rendering the glass transparent and resistant to crazing and chemical attack.

2. The member of claim 1, wherein the applied coating of thermoset polysiloxane resin is from 0.1 to 10 mils thick, the polysiloxane resin having an R to Si ratio of from 1 to 1.9, wherein R represents hydrocarbon radicals attached to silicon.

3. In an electrical member operating at high voltages, a glass tube having outside surfaces ground but not polished to an accuracy of at least 0.001 inch, the ground surfaces having a surface roughness of from about 40 to 100 microinches R. M. S. being translucent but not transparent, and a smooth coating of a transparent, thermoset polysiloxane resin applied to the ground surface of the glass tube, the applied thermoset polysiloxane resin rendering the glass tube transparent, resistant to crazing and maintaining high electrically insulating properties.

References Cited in the file of this patent

UNITED STATES PATENTS

| | | |
|---|---|---|
| 1,437,580 | Wilson | Dec. 5, 1922 |
| 2,204,859 | Hyatt | June 18, 1940 |
| 2,377,600 | Barker | June 5, 1945 |
| 2,408,822 | Tanis | Oct. 8, 1946 |
| 2,504,482 | Goldman | Apr. 18, 1950 |
| 2,588,366 | Dennett | Mar. 11, 1952 |

OTHER REFERENCES

Dow Corning Silicone Note Book 117–O. S. Fluid Series No. 3, September 1948.